United States Patent
Kini et al.

(10) Patent No.: US 8,458,530 B2
(45) Date of Patent: Jun. 4, 2013

(54) CONTINUOUS SYSTEM HEALTH INDICATOR FOR MANAGING COMPUTER SYSTEM ALERTS

(75) Inventors: Prashanth Kini, San Mateo, CA (US); Richard Tauriello, Belmont, CA (US); Marcos M. Campos, Billerica, MA (US); Boriana Milenova, Reading, MA (US); Andres V. Lubomirsky, Fremont, CA (US); Charlie Sum, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 435 days.

(21) Appl. No.: 12/886,891

(22) Filed: Sep. 21, 2010

(65) Prior Publication Data

US 2012/0072780 A1 Mar. 22, 2012

(51) Int. Cl.
G06F 11/00 (2006.01)

(52) U.S. Cl.
USPC .......... 714/47.1; 714/25; 714/47.2; 714/47.3; 714/57

(58) Field of Classification Search
USPC ................. 714/25, 26, 33, 37, 46, 47.1, 47.2, 714/47.3, 57
See application file for complete search history.

(56) References Cited

U.S. PATENT DOCUMENTS

| | | | |
|---|---|---|---|
| 4,318,182 A | 3/1982 | Bachman et al. | |
| 5,113,522 A | 5/1992 | Dinwiddie et al. | |
| 5,222,217 A | 6/1993 | Blount et al. | |
| 5,283,856 A | 2/1994 | Gross et al. | |
| 5,347,632 A | 9/1994 | Filepp et al. | |
| 5,357,612 A | 10/1994 | Alaiwan | |
| 5,465,328 A | 11/1995 | Dievendorff et al. | |
| 5,627,764 A | 5/1997 | Schutzman et al. | |
| 5,649,102 A | 7/1997 | Yamauchi et al. | |
| 5,721,825 A | 2/1998 | Lawson et al. | |
| 5,754,841 A | 5/1998 | Carino, Jr. | |
| 5,774,668 A | 6/1998 | Choquier et al. | |
| 5,790,807 A | 8/1998 | Fishler et al. | |
| 5,802,253 A | 9/1998 | Gross et al. | |
| 5,828,835 A | 10/1998 | Isfeld et al. | |
| 5,852,818 A | 12/1998 | Guay et al. | |

(Continued)

OTHER PUBLICATIONS

Ravi Kokku et al., "Half-pipe Anchoring: An Efficient Technique for Multiple Connection Handoff," Proceedings 10th International Conference on Network Protocols, Nov. 12, 2002, XP010632563, 10 pages.

(Continued)

*Primary Examiner* — Joseph D Manoskey
(74) *Attorney, Agent, or Firm* — Hickman Palermo Truong Becker Bingham Wong LLP

(57) ABSTRACT

A method is provided for detecting when users are being adversely impacted by poor system performance. A system health indicator is determined that is based on the amount of work that is blocked waiting for each of a set of an external events and combined with a heuristic that is based on the number of users waiting for the work to complete. The system health indicator is compared to a threshold such that an alert is generated when the system health indicator crosses the threshold. However, the system health indicator is designed so that an alert is only generated when a significant user base is or will in the near future experience a problem with the system. Furthermore, the system health indicator is designed to vary smoothly to maintain its suitability for the application of predictive technology.

22 Claims, 4 Drawing Sheets

U.S. PATENT DOCUMENTS

| | | | |
|---|---|---|---|
| 5,862,325 A | 1/1999 | Reed et al. |
| 5,867,665 A | 2/1999 | Butman et al. |
| 5,867,667 A | 2/1999 | Butman et al. |
| 5,870,562 A | 2/1999 | Butman et al. |
| 5,878,056 A | 3/1999 | Black et al. |
| 5,884,035 A | 3/1999 | Butman et al. |
| 5,890,167 A | 3/1999 | Bridge, Jr. et al. |
| 5,918,059 A | 6/1999 | Tavallaei et al. |
| 5,933,604 A | 8/1999 | Inakoshi |
| 5,940,839 A | 8/1999 | Chen et al. |
| 5,951,694 A | 9/1999 | Choquier et al. |
| 5,970,439 A | 10/1999 | Levine et al. |
| 5,995,980 A | 11/1999 | Olson et al. |
| 5,999,931 A | 12/1999 | Breitbart et al. |
| 6,026,430 A | 2/2000 | Butman et al. |
| 6,029,205 A | 2/2000 | Alferness et al. |
| 6,035,379 A | 3/2000 | Raju et al. |
| 6,041,357 A | 3/2000 | Kunzelman et al. |
| 6,058,389 A | 5/2000 | Chandra et al. |
| 6,067,540 A | 5/2000 | Hyde |
| 6,073,129 A | 6/2000 | Levine et al. |
| 6,088,728 A | 7/2000 | Bellemore et al. |
| 6,178,529 B1 | 1/2001 | Short et al. |
| 6,182,086 B1 | 1/2001 | Lomet et al. |
| 6,185,555 B1 | 2/2001 | Sprenger et al. |
| 6,188,699 B1 | 2/2001 | Lang et al. |
| 6,192,378 B1 | 2/2001 | Abrams et al. |
| 6,222,840 B1 | 4/2001 | Walker et al. |
| 6,243,751 B1 | 6/2001 | Chatterjee et al. |
| 6,247,017 B1 | 6/2001 | Martin |
| 6,304,882 B1 | 10/2001 | Strellis et al. |
| 6,327,622 B1 | 12/2001 | Jindal et al. |
| 6,334,114 B1 | 12/2001 | Jacobs et al. |
| 6,338,074 B1 | 1/2002 | Poindexter et al. |
| 6,393,423 B1 | 5/2002 | Goedken |
| 6,427,146 B1 | 7/2002 | Chu |
| 6,442,568 B1 | 8/2002 | Velasco et al. |
| 6,466,950 B1 | 10/2002 | Ono |
| 6,473,794 B1 | 10/2002 | Guheen et al. |
| 6,490,574 B1 | 12/2002 | Bennett et al. |
| 6,493,826 B1 | 12/2002 | Schofield et al. |
| 6,515,968 B1 | 2/2003 | Combar et al. |
| 6,519,571 B1 | 2/2003 | Guheen et al. |
| 6,529,932 B1 | 3/2003 | Dadiomov et al. |
| 6,536,037 B1 | 3/2003 | Guheen et al. |
| 6,539,381 B1 | 3/2003 | Prasad et al. |
| 6,556,659 B1 | 4/2003 | Bowman-Amuah |
| 6,560,592 B1 | 5/2003 | Reid et al. |
| 6,587,866 B1 | 7/2003 | Modi et al. |
| 6,601,101 B1 | 7/2003 | Lee et al. |
| 6,651,012 B1 * | 11/2003 | Bechhoefer ..................... 702/34 |
| 6,654,907 B2 | 11/2003 | Stanfill et al. |
| 6,658,596 B1 | 12/2003 | Owen |
| 6,691,155 B2 | 2/2004 | Gottfried |
| 6,697,791 B2 | 2/2004 | Hellerstein et al. |
| 6,704,831 B1 | 3/2004 | Avery |
| 6,704,886 B1 | 3/2004 | Gill et al. |
| 6,728,748 B1 | 4/2004 | Mangipudi et al. |
| 6,757,710 B2 | 6/2004 | Reed |
| 6,769,074 B2 | 7/2004 | Vaitzblit |
| 6,793,625 B2 | 9/2004 | Cavallaro et al. |
| 6,802,003 B1 | 10/2004 | Gross et al. |
| 6,816,907 B1 | 11/2004 | Mei et al. |
| 6,826,182 B1 | 11/2004 | Parthasarathy |
| 6,826,579 B1 | 11/2004 | Leymann et al. |
| 6,850,893 B2 | 2/2005 | Lipkin et al. |
| 6,868,413 B1 | 3/2005 | Grindrod et al. |
| 6,882,994 B2 | 4/2005 | Yoshimura et al. |
| 6,889,231 B1 | 5/2005 | Souder et al. |
| 6,917,946 B2 | 7/2005 | Corl, Jr. et al. |
| 6,925,476 B1 | 8/2005 | Multer et al. |
| 6,980,988 B1 | 12/2005 | Demers et al. |
| 7,003,531 B2 | 2/2006 | Holenstein et al. |
| 7,031,974 B1 | 4/2006 | Subramaniam |
| 7,058,957 B1 | 6/2006 | Nguyen |
| 7,065,537 B2 | 6/2006 | Cha et al. |
| 7,080,382 B2 | 7/2006 | Sexton et al. |
| 7,089,228 B2 | 8/2006 | Arnold et al. |
| 7,095,871 B2 | 8/2006 | Jones et al. |
| 7,149,738 B2 | 12/2006 | Kumar et al. |
| 7,174,379 B2 | 2/2007 | Agarwal et al. |
| 7,177,866 B2 | 2/2007 | Holenstein et al. |
| 7,178,050 B2 | 2/2007 | Fung et al. |
| 7,243,256 B2 | 7/2007 | Kaiya et al. |
| 7,263,590 B1 | 8/2007 | Todd et al. |
| 7,269,157 B2 | 9/2007 | Klinker et al. |
| 7,424,396 B2 * | 9/2008 | Dodeja et al. .................... 714/25 |
| 7,506,215 B1 * | 3/2009 | Maw et al. .................. 714/47.2 |
| 2001/0032137 A1 | 10/2001 | Bennett et al. |
| 2001/0047270 A1 | 11/2001 | Gusick et al. |
| 2001/0052137 A1 | 12/2001 | Klein |
| 2001/0056493 A1 | 12/2001 | Mineo |
| 2002/0049845 A1 | 4/2002 | Sreenivasan et al. |
| 2002/0052885 A1 | 5/2002 | Levy |
| 2002/0073019 A1 | 6/2002 | Deaton |
| 2002/0073139 A1 | 6/2002 | Hawkins et al. |
| 2002/0091685 A1 | 7/2002 | Feldman et al. |
| 2002/0112008 A1 | 8/2002 | Christenson et al. |
| 2002/0116457 A1 | 8/2002 | Eshleman et al. |
| 2002/0129157 A1 | 9/2002 | Varsano |
| 2002/0133507 A1 | 9/2002 | Holenstein et al. |
| 2002/0138582 A1 | 9/2002 | Chandra et al. |
| 2002/0144010 A1 | 10/2002 | Younis et al. |
| 2002/0161896 A1 | 10/2002 | Wen et al. |
| 2002/0194015 A1 | 12/2002 | Gordon et al. |
| 2002/0194081 A1 | 12/2002 | Perkowski |
| 2003/0005028 A1 | 1/2003 | Dritschler et al. |
| 2003/0007497 A1 | 1/2003 | March et al. |
| 2003/0014523 A1 | 1/2003 | Teloh et al. |
| 2003/0037029 A1 | 2/2003 | Holenstein et al. |
| 2003/0037146 A1 | 2/2003 | O'Neill |
| 2003/0039212 A1 | 2/2003 | Lloyd et al. |
| 2003/0046421 A1 | 3/2003 | Horvitz et al. |
| 2003/0088671 A1 | 5/2003 | Klinker et al. |
| 2003/0108052 A1 | 6/2003 | Inoue et al. |
| 2003/0110085 A1 | 6/2003 | Murren et al. |
| 2003/0135523 A1 | 7/2003 | Brodersen et al. |
| 2003/0135609 A1 | 7/2003 | Carlson et al. |
| 2003/0161468 A1 | 8/2003 | Iwagaki et al. |
| 2003/0177187 A1 | 9/2003 | Levine et al. |
| 2003/0208523 A1 | 11/2003 | Gopalan et al. |
| 2003/0212657 A1 | 11/2003 | Kaluskar et al. |
| 2003/0212670 A1 | 11/2003 | Yalamanchi et al. |
| 2003/0229804 A1 * | 12/2003 | Srivastava et al. ............ 713/200 |
| 2003/0236834 A1 | 12/2003 | Gottfried |
| 2004/0024771 A1 | 2/2004 | Jain et al. |
| 2004/0024774 A1 | 2/2004 | Jain et al. |
| 2004/0024794 A1 | 2/2004 | Jain et al. |
| 2004/0024979 A1 | 2/2004 | Kaminsky et al. |
| 2004/0034640 A1 | 2/2004 | Jain et al. |
| 2004/0034664 A1 | 2/2004 | Jain et al. |
| 2004/0064548 A1 | 4/2004 | Adams et al. |
| 2004/0093512 A1 | 5/2004 | Sample |
| 2004/0103195 A1 | 5/2004 | Chalasani et al. |
| 2004/0107125 A1 | 6/2004 | Guheen et al. |
| 2004/0111506 A1 | 6/2004 | Kundu et al. |
| 2004/0117794 A1 | 6/2004 | Kundu |
| 2004/0133591 A1 | 7/2004 | Holenstein et al. |
| 2004/0176996 A1 | 9/2004 | Powers et al. |
| 2004/0181476 A1 | 9/2004 | Smith et al. |
| 2004/0268357 A1 | 12/2004 | Joy et al. |
| 2005/0010545 A1 | 1/2005 | Joseph |
| 2005/0021567 A1 | 1/2005 | Holenstein et al. |
| 2005/0021771 A1 | 1/2005 | Kaehn et al. |
| 2005/0033809 A1 * | 2/2005 | McCarthy et al. ............ 709/205 |
| 2005/0125371 A1 | 6/2005 | Bhide et al. |
| 2005/0165925 A1 | 7/2005 | Dan et al. |
| 2005/0183072 A1 | 8/2005 | Horning et al. |
| 2005/0193024 A1 | 9/2005 | Beyer et al. |
| 2005/0239476 A1 | 10/2005 | Betrabet et al. |
| 2005/0240649 A1 | 10/2005 | Elkington et al. |
| 2005/0262205 A1 | 11/2005 | Nikolov et al. |
| 2005/0267965 A1 | 12/2005 | Heller |
| 2006/0036617 A1 | 2/2006 | Bastawala et al. |
| 2006/0112135 A1 | 5/2006 | Warshawsky |
| 2007/0162260 A1 * | 7/2007 | Nordstrom .................... 702/186 |

| | | |
|---|---|---|
| 2007/0226323 A1 | 9/2007 | Halpern |
| 2009/0112809 A1* | 4/2009 | Wolff et al. .................. 707/3 |
| 2012/0271594 A1* | 10/2012 | Yan et al. .................. 702/183 |

OTHER PUBLICATIONS

Ying-Dar Lin et al., "Direct Web Switch Routing with State Migration, TCP Masquerade, and Cookie Name Rewriting," Globecom 2003, IEEE Global Telecommunications Conference, Dec. 12003, IEEE, CP010677300, pp. 3663-3667.

Chase, Jeffrey S., et al., "Dynamic Virtual Clusters in a Grid Site Manager," Proceedings of the 12$^{th}$ IEEE International Symposium on High Performance Distributed Computing, 2003, XP-010643715, 12 pgs.

Shiva, S.G., et al., "Modular Description/Simulation/Synthesis Using DDL," 19$^{th}$ Design Automation Conference 1982, IEEE Press, pp. 321-329.

Skow, Eric, et al., "A Security Architecture for Application Session Handoff," 2002, IEEE International Conference Proceedings, Apr. 28-May 2, 2002, vol. 1 of 5, pp. 2058-2063, XP010589848.

Song, Henry, et al., "Browser State Repository Service," Lecture Notes in Computer Science, vol. 2414, 2002, pp. 1-14, XP002904339.

Spiegler, Israel, "Automating Database Construction," ACM SIGMIS Database, vol. 14, Issue 3, Spring 1983, pp. 21-29.

Kei Kurakawa et al., "Life Cycle Design Support Based on Environmental Information Sharing," IEEE, Feb. 1-3, 1999, Proceedings EcoDesign '99, First International Symposium, pp. 138-142.

Gunther, Oliver et al., "MMM: A Web-Based System for Sharing Statistical Computing Modules," IEEE, May-Jun. 1997, vol. 1, Issue 3, pp. 59-68.

* cited by examiner

FIG. 3

| Wait Class | %time spent in wait class |
|---|---|
| commit | 10% |
| user I/O | 40% |
| network | 30% |
| user locking | 20% |

300

CONTINUOUS SYSTEM HEALTH INDICATOR FOR MANAGING COMPUTER SYSTEM ALERTS

FIELD OF THE INVENTION

The present invention relates to monitoring computer system performance and detecting issues that need technician attention.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Technicians prefer to detect and begin resolving incidents in which system operations are failing or performing poorly before end-users contact them with complaints. To that end, companies may invest in monitoring software that is capable of collecting hundreds of distinct measurements. A problem that arises when using such monitoring software on a large complex system that may experience a large number of independent problems is that alerts are generated for issues that do not require attention. Such false positive alerts waste precious time as technicians diagnose non-problems, and false positive alerts obscure the alerts that do represent critical problems.

Single Measurement Thresholds

One approach to automated incident detection is to define alerting thresholds for certain individual measurements while leaving other measurements without thresholds even though those other measurements may provide insight into the nature of the incident. One challenge of single-measurement thresholds is that a single incident can, over time, affect the values of multiple measurements, often leading to each such affected measurement independently causing an alert. It may not be obvious how many distinct problems need to be addressed, with the consequent risks of redundant investigation (when a single problem is treated as several) or delayed response (when several problems are present, but one is incorrectly assumed to be the root cause of the others).

Another challenge is that the reliability of the alert depends on choosing the correct thresholds for each of the individual measurements. An incorrectly chosen threshold value can result in either generating false positive alerts or missing important alerts. Even if thresholds for identifying critical problems (referred to herein as a critical threshold) could be accurately chosen, an alert is not generated until the system is already experiencing a critical problem. A goal is to be able to predict that a critical problem is imminent based on a measurement value that is still at a sub-critical level. A sub-critical alert would indicate that the system is not yet experiencing a critical problem, but soon will be if steps are not taken to thwart the impending problem. For example, if a process that is run to generate database table statistics repeatedly fails, the statistics used in generating query execution plans may become outdated over time. Eventually, the performance of some queries may degrade due to relying on outdated statistics information. It may be difficult to set a threshold that accurately predicts a problem before the problem becomes critical and which does not generate too many false positive alerts.

Another limitation of single-measurement thresholds is that it is often necessary to examine multiple measurements in order to identify how many users' operations and which types of operations are failing or executing inefficiently. If a failure or inefficiency impacts only a single user, technicians would usually prefer not to be alerted by the monitoring system. The information conveyed by the occurrence of a single-measurement alert is not by itself sufficient to accurately prioritize the alert. A technician must be assigned to investigate each such alert, by examining the totality of thresholded and un-thresholded measurements, to determine whether it is worthwhile to take action on it. The effort of responding to the alert is wasted in those cases when the alert is not worth taking action on, so technology that reduces the number of false positive alerts would reduce labor costs.

In response to the shortcomings of using single-measurement threshold, an alternative approach is to train a machine learning algorithm to determine a relationship between available measurement values and end-users' subjective evaluations of incidents. Training such a model for incident detection requires a human to label each of a set of monitored measurements for a certain time interval with an indication of the human's subjective perception of system performance. The labels are chosen from a short list (for example, "bad performance", "normal performance"). The resulting model can be applied to the current monitored measurements to derive an evaluation as to which label should be used to describe the current state.

A challenge in implementing such a machine learning solution is that historical subjective evaluations with precise beginning and ending times of incidents are unlikely to be available. Furthermore, the process of regularly recording such subjective evaluations is an expense end-users are likely to be reluctant to undertake in the absence of evidence that the machine learning algorithm will be successful.

Therefore, even if one seeks to gather subjective evaluations and base alerting on what can be learned from them, it would be helpful to seed those evaluations by soliciting user input for only those time periods during which there is a high probability of user dissatisfaction. The alerts would provide value by increasing end-user goodwill and would identify the time intervals for which subjective feedback is most needed. In addition to reducing the amount of data the end users are asked to look at, directing end users to evaluate particular time intervals also facilitates tracking their progress.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a table showing example values for the percentage of time spent waiting for events in each wait class, according to an embodiment of the invention.

DETAILED DESCRIPTION

Figure 1:
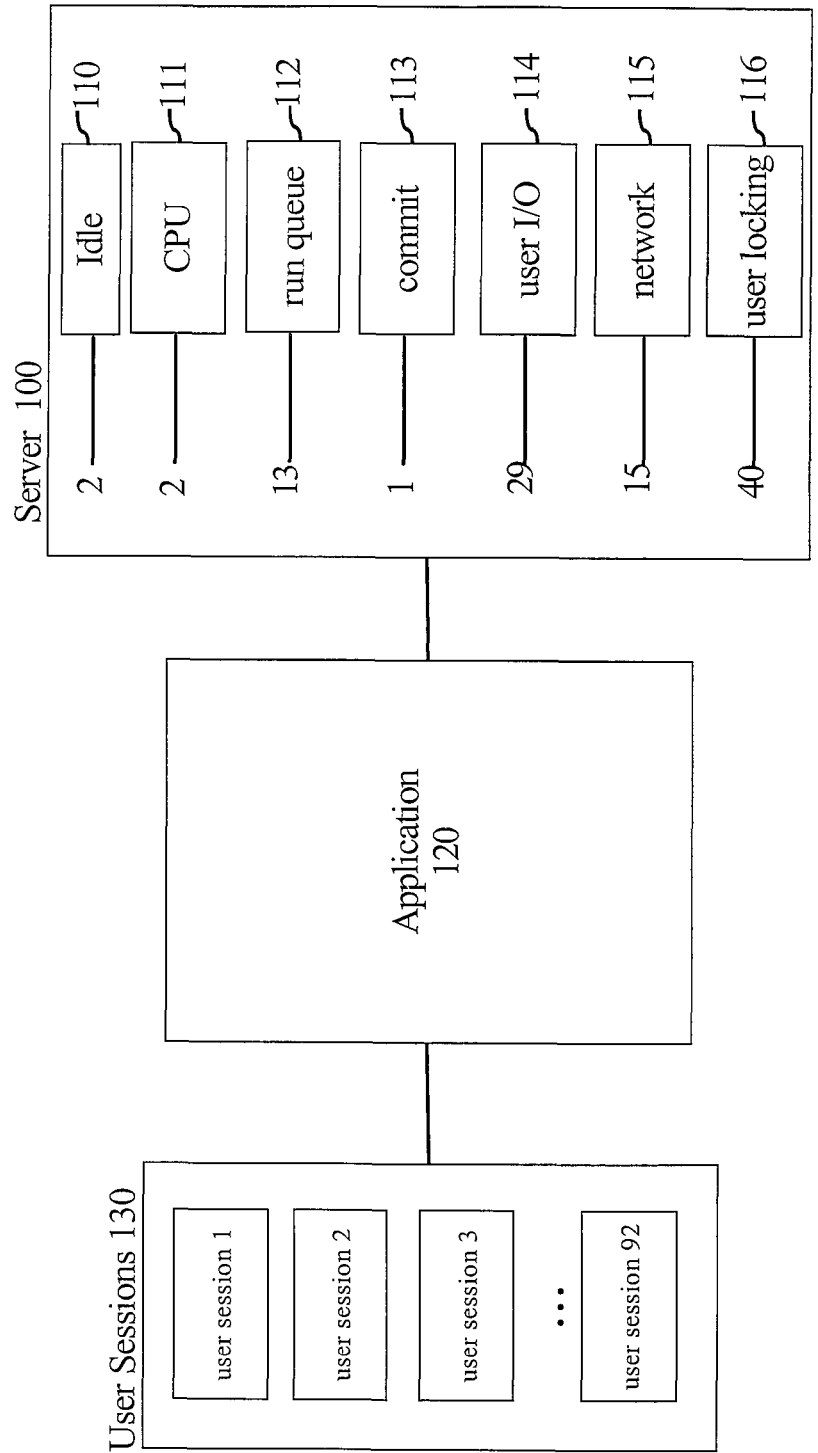
FIG. 1 shows an exemplary system server with user sessions in different processing states, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system health indicator is needed that may be relied upon to determine whether a system is experiencing a problem (or about to experience a problem) that requires human attention. What constitutes a problem for which human attention is required is somewhat subjective. An indicator that best correlates with poor efficiency in SQL execution, for example, is how much time active user sessions spend waiting on events. The system health indicator is based upon the amount of time user sessions spend waiting.

However, even if a system is performing inefficiently, if the poor performance is not impacting any user or large group of users, then it may not be necessary for the source of the poor performance to be diagnosed and fixed. When the overall workload is low and/or the server is responsive overall, there may not be a need to generate an alert because no harm or inconvenience is caused by the inefficiency.

Workloads that are known to be inefficient are often run outside of business hours, and the business conditions of the monitoring service may preclude manually informing the monitoring system of when those business hours are. For example, such workloads may include multiple concurrent batch jobs. If a long-running job that normally takes 2 hours to run is scheduled to run unattended during the night, there is probably no user waiting for the job to finish. Therefore, if that same job takes four hours to complete on a poorly performing system instead of the expected 2 hours, the longer running time would not inconvenience any user. Even when a job experiences a more critical problem, unless that particular job absolutely must run to completion that night, the business might prefer to abort the job in the morning (if necessary) and investigate its poor performance when labor costs are lower instead of having a technician urgently alerted in the middle of the night.

The health indicator not only measures system performance in terms of user wait time, but also takes into account the extent to which users are impacted by a performance problem so that the system health indicator only crosses an alert threshold when the system needs to be fixed.

System Processing States

Some threads of execution may be associated with a user session. The term "user session" is used herein to refer to a thread of execution in the server that performs work requested by an application client on behalf of a user. Each user session may be in one of several execution states: running, scheduled to run, waiting, or idle. Running means that a processor is currently executing instructions to perform work for the user session. Scheduled to run means that the user session is waiting for a processor to start executing the thread's instructions. Waiting means that the user session is blocked while waiting for an event that is generated internal to the server system but external to the thread of execution. Idle means that even though the session exists, the server system is not currently performing work for the application. For example, the application may be waiting for user input or input from some other external interface. An active user session is a user session that is not idle. That is, an active user session is one that is running, scheduled to run, or waiting on an event.

There are several different kinds of events that block an application from making forward progress. For example, an application may wait for data to be read from or written to the disk (I/O wait). Another example is that an application may be blocked while waiting for a response from another software component over the network or an inter-node communication within a multi-node server. Also, an application may wait for a transaction to commit. In addition, an application may be blocked waiting for a lock to be freed such as a lock on a record in a database table. Measurement values indicating time waiting on individual wait events may be aggregated into "wait classes". The wait classes are grouped by proximate cause. That is, a single problem may impact the wait times for multiple wait events, and the wait times for these similarly impacted wait events may be aggregated into a single wait class wait time value. For example, a disk or memory failure may result in longer user I/O waits, or a deadlock could cause long application locking waits.

Measurement System Context

In one approach, a server system stores snapshots of fine-grained system performance metrics within a repository at frequent intervals. An example of this approach is Oracle's Automatic Workload Repository storing measurements on behalf of a database server. A management application may retrieve and aggregate samples of data from the repository at intervals less frequent than the data is captured. A management application may analyze the data and determine whether the system is functioning properly or if the data indicates that there is a problem with the system. Analysis of the data requires some a priori knowledge of what values the data should have under normal operating conditions. For effective use, a technician must be able to establish limits or thresholds that determine when the sampled data is outside of the normal range.

Database Efficiency Metrics

When a server thread that is performing work on behalf of an application is blocked while waiting for an event, the application work is not being performed. Thus, wait events that cause the server thread to block instead of making forward progress for the application may be an indicator of server inefficiency and poor performance. A user running an application that spends much time in a wait class will perceive the system as providing poor performance. In an embodiment, the system health indicator measures efficiency of application execution in terms of excessive user I/O, concurrency conflicts, intra-cluster communication, etc. In an embodiment, a system health indicator may be used to identify issues with SQL execution on a database server. In an embodiment, better system performance may be indicated by a low system health indicator value and performance degradation may be indicated by a high system health indicator value.

FIG. 1 shows an exemplary system in which Application 120 is connected to Server 100 that is performing work on behalf of user sessions 130. Counting user sessions is one way to measure an amount of work, and is used herein as an example of measuring an amount of work. However, there may be other metrics for an amount of work and other ways of measuring an amount of work. In this example, there are 102 user sessions. There are seven processing states 110-116 depicted inside Server 100. The number to the left of each processing state is the number of user sessions in that processing state. There are 2 user sessions that are in Idle state 110, which means that in this example, there are 100 active user sessions (idle sessions are not active). There are 2 sessions currently running on CPU 111. There are 13 sessions on run queue 112 scheduled to run. In this example, there is only 1 session waiting for a transaction to commit in processing state 113 that corresponds to wait class "commit." There are 29 sessions waiting for disk I/O events to complete in processing state user I/O 114 corresponding to wait class User I/O. There are 15 sessions waiting for network I/O in processing state 115 corresponding to wait class "network", and 40 sessions waiting for a lock on a shared object to be released in processing state 116 that corresponds to wait class "user locking." A wait class may represent waiting for more than one kind of related event. For example, there are many different events related to disc I/O (e.g. read vs. write events). Sessions waiting for any of these events would be considered waiting in wait class user I/O.

Several measurement values are retrieved from the repository and used to determine the system health metric:

the percentage of active user sessions' server-side time spent waiting for each type of wait event: The percentage of active user sessions' server-side time spent waiting for each type of wait event is a measure of performance that is based on user session wait times. For each wait class, the wait time for each wait class is aggregated across all sessions. The percentage of time for each wait class is the wait time for that wait class relative to the total time user sessions spend in any processing state.

the average number of user sessions waiting for an event in each wait class: For each wait class, the average number of user sessions waiting for an event in that wait class is determined by averaging the number of sessions counted in each wait class across snapshots of data that is captured more frequently than the aggregation time interval. Because the measurement used in the calculation is an aggregation of multiple individually collected data points, the average number might not have the same value as the latest collected data point. Nevertheless, for simplicity of expression, the present tense is used herein to describe the average number of user sessions that are waiting rather than the more accurate but cumbersome expression of "have been waiting during the interval." This use of present tense is similarly use for all aggregated measurements over the time interval.

the total number of active user sessions currently running on the system: The total number of active user sessions is a count of all of the user sessions waiting for any wait event in addition to the running and scheduled to run user sessions.

the average number of active user sessions typically found on the system: This baseline number is acquired during a machine learning phase.

Although user session wait time is a good indication of server efficiency, relying only on that measure may not be fine-grained enough to consider the impact of the inefficiency on users. A single session that is blocked for an atypically long time can skew the measurement to a large extent. Typical waits last a small fraction of a second, but a poorly written application or a non-responsive resource can cause a session to wait for minutes or longer. It is quite possible for a single session to be responsible for the majority of time spent waiting in the server, even if there are a large number of sessions and the other sessions are executing efficiently. The system health indicator should alert the presence of overall system problems, and not that an individual user is running an inefficient application.

Another example of how a pure efficiency metric may not consider user impact is that the network might be exceptionally slow, but if only a few user sessions are waiting for a network response, the overall impact to users may not justify an alert even if the network is experiencing a problem. The system health indicator can be made more useful by considering the overall impact of the variations of the performance impact from one wait class to another. A weighting factor that reflects the amount of work waiting for a wait class may be used so as to quantify the user impact of a particular proximate cause.

To address the need for a finer grained, system-centric measure, an alternate measurement may be used: the average number of active sessions waiting for a particular class of wait events. The challenge with using the average number of sessions by itself as a measure of efficiency is that all sessions do not represent the same amount of work. There can be a large variation, even within the same customer's workloads, as to how much work is submitted to the database by each session. However, the count of sessions waiting for each class of wait events may be used to determine a user impact weighting factor in the determination of the system health indicator value, rather than a stand-alone indicator. To avoid alerting technicians of inefficiencies or failures that are specific to a single session, the percentage of time spent waiting on a particular wait class should be discounted if the count of sessions waiting on that particular wait class does not suggest that there are multiple sessions impacted by the same root cause.

Combining Measurements into a System Health Indicator

Defining the system health indicator for database efficiency requires combining the above-mentioned measurements values. In order to make the system health indicator reflect the impact to users and priority to fix a problem, the absolute performance measurements are weighted.

In an embodiment, the system health indicator is a scaled sum of scaled waiting times for each wait class where the sum is scaled by the amount of overall activity in the system and the waiting times are scaled by the user impact of each wait class. The system health indicator is computed as:

$$Healthindicator(t) = activityweight(t) * \sum_i workweight_i(t) * timewaiting_i(t)$$

Figure 2:
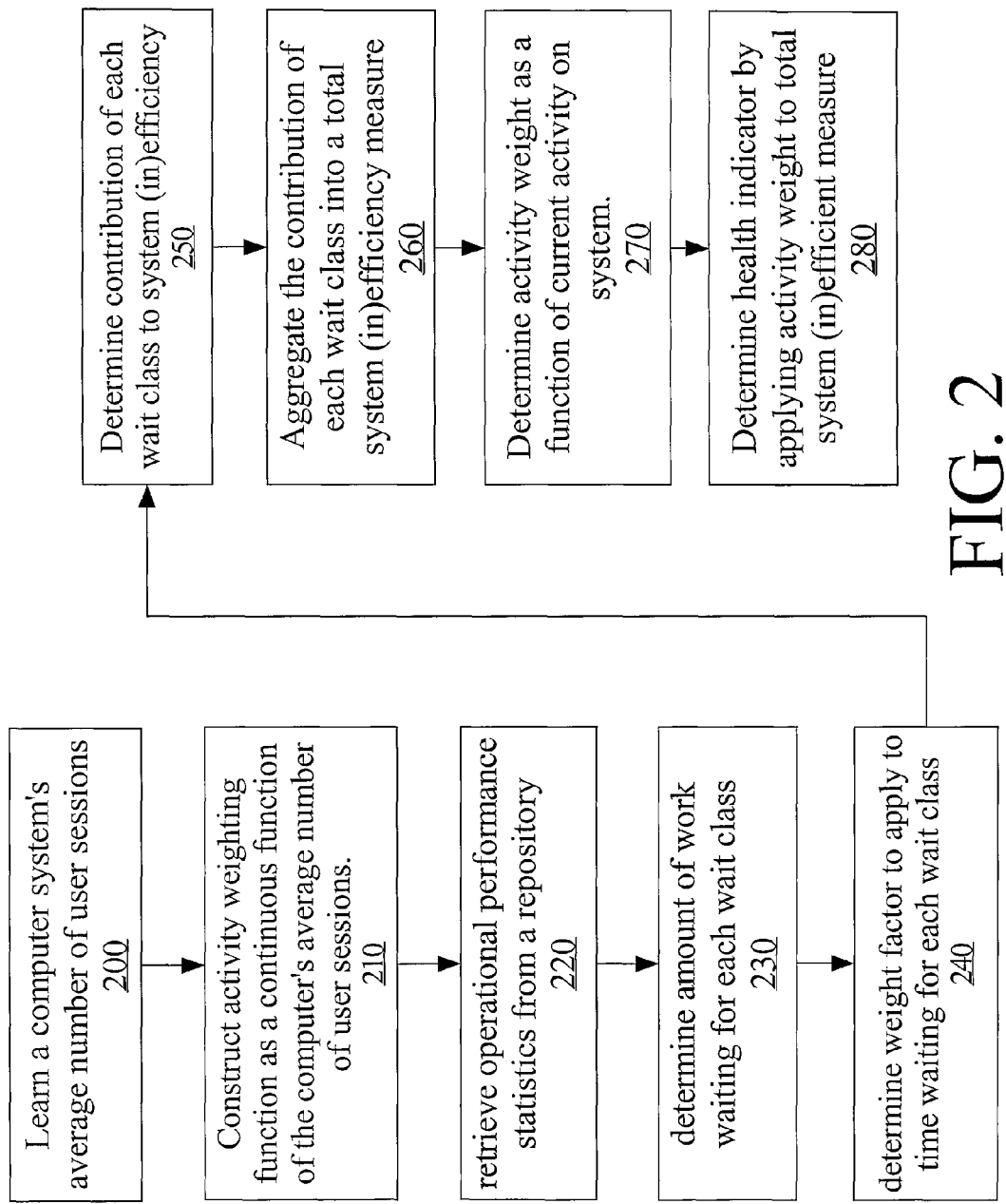
FIG. 2 is a flow diagram showing steps for calculating a system health indicator, according to an embodiment of the invention.

This equation is explained in pieces herein. FIG. 2 is a flow diagram of the steps needed to compute the system health indicator in an embodiment of the invention. The steps need not be performed in the order indicated in the flow diagram, and several steps may be performed concurrently. In Step 200, each system enters a learning cycle to determine an activity measurement based on the average number of active user sessions normally handled by the system.

In Step 210, an activity weighting function is constructed. In an embodiment, the activity weighting function has this form:

$$activityweight(t) = \frac{e^{activity(t) - 0.8 * baselineactivity}}{1 + e^{activity(t) - 0.8 * baselineactivity}}$$

The activity weighting function is a scaling function (in this embodiment, a logistic function) that takes as input the computer system's average number of active user sessions at time t on whose behalf a server application performs work (activity (t)). The activity weighting function is designed to return an activity weighting factor that is a value between 0 and 1. The function returns a value of 0.5 when the current active session count is 80% of the baseline average for the system (baselineactivity) as determined during the learning phase as described above. For example, if the baseline average number of active sessions was determined to be 95 during the learning phase, then the scaling function would return 0.5 when there are 76 active sessions in operation (i.e. 0.8*95). When there are more than 76 active sessions, the activity weighting factor will be a number close to 1, and when there are less than 76 active sessions, the activity weighting factor will be a number close to 0.

The system health indicator value for a time interval is determined based on the number of active sessions during that interval along with fined grained time measurement values for each wait class. In Step 220, the time performance measurement values are retrieved from a repository. In an embodiment, each measurement value activity(t), timewaiting$_i$(t), work$_i$(t)) is a rolling average of the corresponding measurement over the hour preceding time t. In an embodiment intended to provide real-time monitoring, time t is the most recent time for which measurements are available.

In the system health indicator computation, wait classes are partitioned by proximate cause into i number of wait classes. In an embodiment, the waiting time measurement (timewaiting) is the percentage of time that user sessions collectively spend waiting on a particular wait class. In Step 230, the total time that work is spent waiting on each of the i wait classes is determined. Thus, the timewaiting$_i$ measurement is an aggregation of time that all user sessions spent in wait class i in relation to time spent in other states.

Each wait class time aggregation is also weighted based on the amount of work waiting due to that wait class, where the amount of work indicates the user impact of waiting for a particular wait class and is a measure whose value distinguishes cases where a single operation or sequence of operations is waiting from cases where multiple, independent operations are waiting. In an embodiment, the user impact weighting factor, workweight$_i$, is a function of the average number of user sessions that are waiting on wait class i (work$_i$). In Step 240, a work impact weighting factor for the wait time measurement for each particular wait class is determined. In an embodiment, workweight$_i$ is a logistic function of work$_i$. A logistic function is a sigmoidal function that returns a value between 0 and 1. In an embodiment, the logistic function is derived so that the function returns 0.5 when the average number of sessions waiting in a wait class is 1.5. Thus, when the average number of sessions waiting on a wait class is more than 2, the impacted work weighting factor for the time spent in that wait class will be close to 1, so that the time spent in that wait class is fully reflected in the system health indicator value. If the average number of sessions waiting on a wait class is 1 or less, then the logistics function will return a number close to 0, and the contribution to the system health indicator of the time spent in that wait class is greatly diminished. In an embodiment, the following instantiation of the logistic function is used to give a slope that is not too steep, enhancing the continuity of the system health indicator:

$$workweight_i(t) = \frac{e^{4work_i(t)-6}}{1+e^{4work_i(t)-6}}$$

In Step 250, the contribution towards the system health indicator from a particular wait class i is determined by multiplying the percentage of time spent in each wait class across active sessions by the work impact of each wait class: workweight$_i$*timewaiting$_i$.

In Step 260, the contribution towards the system health indicator from each of the wait classes is added together:

$$\sum_i workweight_i * timewaiting_i.$$

In Step 270, the activity weight factor is determined based on the weighting function constructed in Step 210. The activity weight factor, activityweight, is a function of the overall active session count. Thus, the activity weight factor is a weighting factor that dramatically lowers the overall system health indicator when the server is processing a less than average work load.

In Step 280, the system health indicator is determined by applying the activity weight factor to the not-yet-weighted system health indicator of the system determined in Step 260.

In an embodiment, the flow described in FIG. 2 is repeated every ten minutes, beginning with Step 220. The fact that the interval of measurement collection and evaluation (ten minutes) is a fraction of the interval over which each rolling average is calculated (one hour) has the effect of smoothing out the system health indicator value.

In an embodiment, the flow repeats from Step 200 every two weeks to keep the baseline activity variable consistent with observed workloads.

Example Calculation of System Health Indicator Value

Here is an example calculation of the system health indicator value for a scenario in which the historical average (baseline) number of active sessions on a host is 95 and there were an average of 100 active sessions being serviced in the previous hour. Table 300 in FIG. 3 shows example percentage of wait times across all 100 active sessions for each of the wait classes. For example, according to the table values, the 100 active sessions have spent 40% of their time waiting for user I/O. The number of user sessions waiting in various wait classes is taken from FIG. 1. As mentioned earlier, FIG. 1 shows an average (over the previous hour) of 1 session waiting for a transaction commit to complete, 29 waiting for user I/O, 15 waiting for a network response, and 40 blocked waiting for a lock to be released.

The weight applied to the amount of work waiting in each weight class is a number close to 1 for any wait class where there has been an average of 2 or more sessions waiting and a number close to 0 when there has only been an average of 1 session waiting. Thus, in this example, the impact for all wait classes except for transaction commits will receive full weight, and any inefficiency created by waiting for transaction commits will contribute a diminished amount to the system health indicator. For example, the weighting factor applied to time spent waiting for a transaction to commit is determined as:

$$workweight_{commit} = \frac{e^{4*1-6}}{1+e^{4*1-6}} = \frac{e^{-2}}{1+e^{-2}} = .119$$

The contribution to the system health indicator of each wait class is the product of the number of sessions waiting and the percentage of time all sessions spend waiting on a wait class. For example, the contribution of each of the wait classes is shown in the table below:

| Wait class | Sessions waiting | workweight | % time | Weighted % time |
|---|---|---|---|---|
| commit | 1.00 | 0.119 | 10.0 | 1.19 |
| user I/O | 29.0 | 1.00 | 40.0 | 40.0 |
| network | 15.0 | 1.00 | 30.0 | 30.0 |
| user locking | 40.0 | 1.00 | 20.0 | 20.0 |

Calculating to 3 significant digits, the sum of the contributions to the system health indicator for all the individual wait classes is (1.19+40.0+30.0+20.0) or 91.2. As noted above the average number of active sessions in the past hour was 100 and the baseline average for the number of active sessions is 95, so the activityweight is computed as:

$$activityweight(t) = \frac{e^{100-0.8*95}}{1+e^{100-0.8*95}} = \frac{e^{24}}{1+e^{24}} = 1.00$$

Thus, the activityweight is 1.00 for this example. Thus, the system health indicator value for this example is 1.00*91.2=91.2.

Critical and Subcritical System Health Indicator Values

A system may be in a critical state when the system is currently experiencing a problem that requires attention. The system health indicator may indicate that the system is in a critical state when the system health indicator value crosses a critical threshold. In an embodiment, the system health indicator is tracked for a training period of two weeks, and then the critical threshold is set to the $95^{th}$ percentile of the system health indicator during the training period. In an embodiment, the critical threshold is configurable per user preference.

A system may be in a sub-critical state when there are signs that performance is degrading, but the system is not yet experiencing problems. The smooth, continuous nature of the function that determines the system health indicator values allows for a warning threshold to warn technicians that the system is in a sub-critical state so that problems may be identified and fixed before users notice the problem. In an embodiment, the system health indicator is tracked for a training period of two weeks, and then the warning threshold is set to the $90^{th}$ percentile of the system health indicator during the training period. In an embodiment, the warning threshold is configurable per user preference.

Hardware Overview

According to an embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
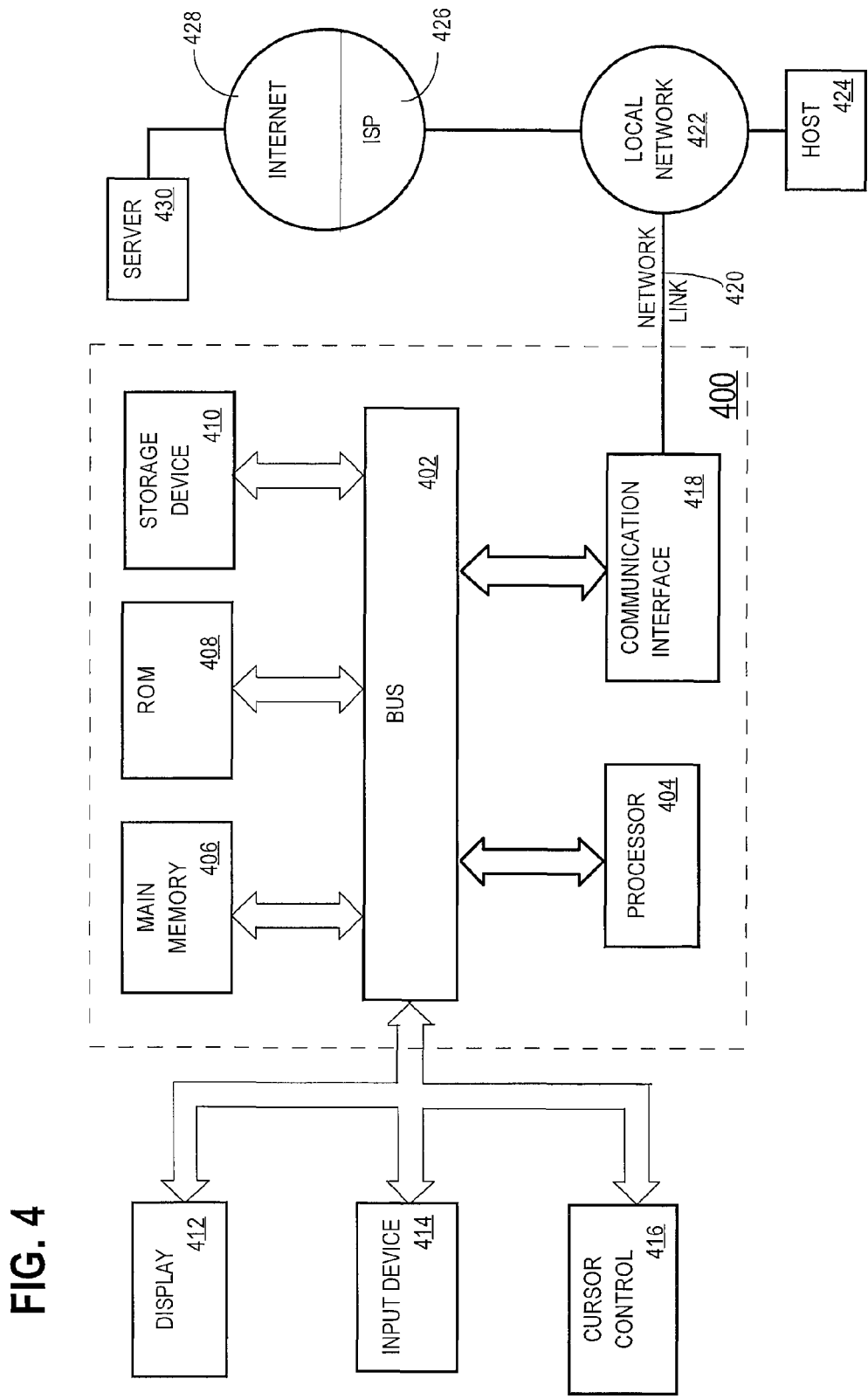
FIG. 4 is a block diagram that illustrates a computer system upon which an embodiment in accordance with the present invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method for measuring health of a computer system over a time interval comprising steps of:
   determining, based on an activity measurement value and a set of time measurement values, a health indicator value that indicates the health of the computer system over the time interval;
   wherein the activity measurement value is based on a number of sessions for which the computer system is actively performing work during the time interval;
   wherein each time measurement value of the set of time measurement values is associated with a wait class of a plurality of wait classes and represents an amount of time during which said work performed by the computer system spends waiting in one of a plurality of wait classes;
   determining an activity weighting factor based on a first scaling function of the activity measurement value, wherein the first scaling function scales the activity measurement value to a value between 0 and a first pre-determined upper bound;
   determining an amount of work waiting on each wait class of the plurality of wait classes;
   determining, based on a second scaling function of the amount of work waiting on said each wait class of the plurality of wait classes, a set of user impact weighting factors associated with said each wait class, wherein the second scaling function scales the amount of work waiting on said each wait class to a number between 0 and a second pre-determined upper bound; and
   one or more computing devices computing the health indicator value over the time interval as a function of the set of time measurement values, the amount of work waiting on said each wait class of the plurality of wait classes, the set of user impact weighting factors, and the activity weighting factor.

2. The method of claim 1, wherein the activity measurement value is a number of active user sessions.

3. The method of claim 1, wherein each time measurement value of the set of time measurement values is a percentage of time spent in a corresponding wait class of the plurality of wait classes.

4. The method of claim 1, wherein the plurality of wait classes include user I/O, network I/O, and waiting for locks.

5. The method of claim 1, wherein said amount of work corresponding to said each wait class is a number of user sessions waiting in the corresponding said each wait class.

6. The method of claim 1, the steps further comprising sending an alert when the health indicator value exceeds a threshold.

7. The method of claim 6, wherein an initial threshold value is determined during a machine learning period for said computer system.

8. The method of claim 1, wherein the threshold is dynamically adjusted based on historical health indicator values determined during the operation of said computer system.

9. The method of claim 1, wherein the activity measurement value and set of time measurement values are collected at a collection time interval of a first duration and aggregated over the time interval, wherein the time interval is an aggregation time interval of a second duration;

wherein the second duration is longer than the first duration, and the activity measurement value and set of time measurement values collected during the collection time interval are aggregated over the aggregation time interval.

10. The method of claim 9, wherein aggregating the activity measurement value and the set of time measurement values over the aggregation time interval is performed as a rolling average over a data collected at a particular number of most-recent time intervals.

11. The method of claim 1, wherein the system health indicator value is computed as a product of the activity weighting factor and a total adjusted wait time, wherein the total adjusted wait time is a sum of adjusted wait times for each wait class; and wherein each adjusted wait time for said each wait class is a product of a time measurement value associated with said each wait class and a user impact value associated with said each wait class.

12. A non-transitory computer-readable medium storing one or more instructions which when executed by one or more processors cause the one or more processors to perform steps comprising:

determining, based on an activity measurement value and a set of time measurement values, a health indicator value that indicates the health of the computer system over the time interval;

wherein the activity measurement value is based on a number of sessions for which the computer system is actively performing work during the time interval;

wherein each time measurement value of the set of time measurement values is associated with a wait class of a plurality of wait classes and represents an amount of time during which said work performed by the computer system spends waiting in one of a plurality of wait classes;

determining an activity weighting factor based on a first scaling function of the activity measurement value, wherein the first scaling function scales the activity measurement value to a value between 0 and a first pre-determined upper bound;

determining an amount of work waiting on each wait class of the plurality of wait classes;

determining, based on a second scaling function of the amount of work waiting on said each wait class of the plurality of wait classes, a set of user impact weighting factors associated with said each wait class, wherein the second scaling function scales the amount of work waiting on said each wait class to a number between 0 and a second pre-determined upper bound; and one or more computing devices computing the health indicator value over the time interval as a function of the set of time measurement values, the amount of work waiting on said each wait class of the plurality of wait classes, the set of user impact weighting factors, and the activity weighting factor.

13. The non-transitory computer-readable medium of claim 12, wherein the activity measurement value is a number of active user sessions.

14. The non-transitory computer-readable medium of claim 12, wherein each time measurement value of the set of time measurement values is a percentage of time spent in a corresponding wait class of the plurality of wait classes.

15. The non-transitory computer-readable medium of claim 12, wherein the plurality of wait classes include user I/O, network I/O, and waiting for locks.

16. The non-transitory computer-readable medium of claim 12, wherein said amount of work corresponding to said each wait class is a number of user sessions waiting in the corresponding said each wait class.

17. The non-transitory computer-readable medium of claim 12, the steps further comprising sending an alert when the health indicator value exceeds a threshold.

18. The non-transitory computer-readable medium of claim 17, wherein an initial threshold value is determined during a machine learning period for said computer system.

19. The non-transitory computer-readable medium of claim 12, wherein the threshold is dynamically adjusted based on historical health indicator values determined during the operation of said computer system.

20. The non-transitory computer-readable medium of claim 12, wherein the activity measurement value and set of time measurement values are collected at a collection time interval of a first duration and aggregated over the time interval, wherein the time interval is an aggregation time interval of a second duration;

wherein the second duration is longer than the first duration, and the activity measurement value and set of time measurement values collected during the collection time interval are aggregated over the aggregation time interval.

21. The non-transitory computer-readable medium of claim 20, wherein aggregating the activity measurement value and the set of time measurement values over the aggregation time interval is performed as a rolling average over a data collected at a particular number of most-recent time intervals.

22. The non-transitory computer-readable medium of claim 12, wherein the system health indicator value is computed as a product of the activity weighting factor and a total adjusted wait time, wherein the total adjusted wait time is a sum of adjusted wait times for each wait class; and wherein each adjusted wait time for said each wait class is a product of a time measurement value associated with said each wait class and a user impact value associated with said each wait class.

* * * * *

UNITED STATES PATENT AND TRADEMARK OFFICE
CERTIFICATE OF CORRECTION

| | | |
|---|---|---|
| PATENT NO. | : 8,458,530 B2 | Page 1 of 1 |
| APPLICATION NO. | : 12/886891 | |
| DATED | : June 4, 2013 | |
| INVENTOR(S) | : Kini et al. | |

It is certified that error appears in the above-identified patent and that said Letters Patent is hereby corrected as shown below:

In the Specification

In column 9, line 36, delete "Subscritical" and insert -- Subcritical --, therefor.

Signed and Sealed this
First Day of October, 2013

Teresa Stanek Rea
*Deputy Director of the United States Patent and Trademark Office*